United States Patent
Dillon et al.

(10) Patent No.: US 7,979,571 B2
(45) Date of Patent: Jul. 12, 2011

(54) METHOD AND SYSTEM FOR PROVIDING LOAD SENSITIVE THROTTLING

(75) Inventors: Douglas Dillon, Gaithersburg, MD (US); Roderick Ragland, Bethesda, MD (US); Charles Hatfield, Leesburg, VA (US); Ashwin Jaiswal, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1006 days.

(21) Appl. No.: 10/319,117

(22) Filed: Dec. 13, 2002

(65) Prior Publication Data

US 2003/0154272 A1 Aug. 14, 2003

Related U.S. Application Data

(60) Provisional application No. 60/348,574, filed on Jan. 15, 2002.

(51) Int. Cl.
*G06F 13/00* (2006.01)
(52) U.S. Cl. ........................ 709/232; 718/105
(58) Field of Classification Search .... 370/230.1–235.1; 709/232–235; 718/105, 104, 102
See application file for complete search history.

(56) References Cited

U.S. PATENT DOCUMENTS

| | | | | |
|---|---|---|---|---|
| 5,799,002 A | * | 8/1998 | Krishnan | 370/234 |
| 5,914,936 A | * | 6/1999 | Hatono et al. | 370/230 |
| 6,826,150 B1 | * | 11/2004 | Bhattacharya et al. | 370/230 |
| 6,996,117 B2 | * | 2/2006 | Lee et al. | 370/429 |
| 7,046,680 B1 | * | 5/2006 | McDysan et al. | 370/396 |
| 7,266,079 B2 | * | 9/2007 | Fan | 370/230 |
| 7,657,628 B1 | * | 2/2010 | McDysan et al. | 709/225 |
| 2002/0083174 A1 | * | 6/2002 | Hayashi et al. | 709/225 |
| 2005/0163048 A1 | * | 7/2005 | Arora et al. | 370/230 |

* cited by examiner

*Primary Examiner* — Kenneth R Coulter
(74) *Attorney, Agent, or Firm* — K&L Gates LLP

(57) ABSTRACT

An approach is provided for shaping traffic of a communication system. Resource usage of a network element of the communication system is determined. The usage is compared with thresholds that are established according to loading of the communication system; these thresholds correspond to various transmission states that limit usage of the resources of the communication system (e.g., bandwidth). Further, based on the comparison, the resource usage of the network element is controlled according to a particular transmission state, thereby ensuring fair access. This approach as particular applicability to shared capacity systems, such as a satellite communication system.

38 Claims, 7 Drawing Sheets

METHOD AND SYSTEM FOR PROVIDING LOAD SENSITIVE THROTTLING

RELATED APPLICATIONS

The present application claims the benefit of U.S. Provisional Patent Application Ser. No. 60/348,574 filed on Jan. 15, 2002, the contents of which are hereby incorporated by reference.

FIELD OF THE INVENTION

The present invention relates generally to a communications system, and is more particularly related to traffic shaping.

BACKGROUND OF THE INVENTION

The maturity of electronic commerce and acceptance of the Internet as a daily tool by a continually growing user base of millions of users intensify the need for communication engineers to develop techniques for enhancing network performance. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements from the network infrastructure.

Consumers of broadband services typically are engaged in retrieving content from the Internet involving a transfer of large amounts of data (e.g., multimedia, graphics, streaming video and audio, etc.). Such heavy users can consume a disproportionate amount system capacity, thereby depriving other users of needed network resources. Traditionally, Internet Service providers (ISPs) do not have a way to effectively allocate and enforce available bandwidth between their customers. Such disproportionate use in amplified in a shared capacity system. Thus, these consumers demand that network providers ensure certain quality of service (QoS) levels. Accordingly, service providers are tasked with guaranteeing fair access by all users.

Based on the foregoing, there is a clear need for improved approaches for providing fair access to shared capacity systems.

SUMMARY OF THE INVENTION

The present invention addresses the above stated needs by performing traffic shaping of a shared capacity communication system using a load sensitive throttling (LST) mechanism. The LST mechanism utilizes a flow control meter to track the load (e.g., outroutes) and a throttle meter to regulate bandwidth that is made available to the users. For example, transmission of content requested by a user from a content server may be limited (i.e., "throttled") by adjusting the throttle meter. That is, the throttle meter enables the LST mechanism to limit heavily active users as the communication system experiences greater load. The LST mechanism imposes, for example, the following transmission states on the users of the communication system, in order of severity of bandwidth limitation: a Non-throttled state, a Soft Throttle state, a Hard Throttle state, and a Discard Throttle state. These transmission states can be correlated to quality of service (QoS) levels (or Committed Information Rate (CIR)). The transmission states correspond to thresholds established according to a leaky bucket scheme, wherein threshold crossings signify transition into a new transmission state. The LST mechanism adjusts the bucket depths and leak rate according to the new transmission state. The LST mechanism can be effected using, for example, the Transmission Control Protocol (TCP) window sizes. TCP receive window for each TCP connection can be calculated from the user window. The user window size for a throttled or non-throttled user can be calculated by taking into account the configured throughput, user's transmission state, and the value of the flow control meter. The LST mechanism, according to one embodiment of the present invention, can be implemented in a gateway of a satellite communication system. The above approach advantageously supports more efficient utilization of a scarce system resources (e.g., bandwidth) by encouraging heavy users to make use of bandwidth during lightly loaded periods. With the LST mechanism, the most economically advantageous users (i.e., light users) are given very good performance, even when the system is heavily loaded, thereby ensuring fair access to system resources.

According to one aspect of an embodiment of the present invention, a method for shaping traffic of a communication system is disclosed. The method includes determining resource usage of a network element of the communication system. The method also includes comparing the usage with a plurality of thresholds that are determined according to loading of the communication system. Further, the method includes controlling, based on the comparison, the resource usage of the network element according to one of a plurality of transmission states corresponding to the plurality of thresholds.

According to another aspect of an embodiment of the present invention, a network apparatus for shaping traffic of a communication system is disclosed. The apparatus includes a plurality of buffers configured to selectively store corresponding content destined to respective plurality of hosts. Also, the apparatus includes logic configured to determine throughput associated with each of the buffers, and to specify one of a plurality of transmission states based upon a comparison of the throughput with a plurality of thresholds corresponding to the transmission states. The thresholds are established based upon loading of the communication system, wherein the logic permits selective transmission of the stored content according to the one transmission state.

According to another aspect of an embodiment of the present invention, a hub station system for shaping traffic of a communication system is disclosed. The system includes a transmission system for communicating over a satellite to a terminal interfacing a host. The system also includes a gateway coupled to the transmission system and configured to communicate with a data network coupled to a content server. The gateway includes memory configured to selectively store content destined to the host from the content server; and logic configured to determine throughput associated with the host, and to specify one of a plurality of transmission states based upon a comparison of the throughput with a plurality of thresholds corresponding to the transmission states. The thresholds are established based upon loading of the transmission system, wherein the logic permits selective transmission of the stored content according to the one transmission state.

In another aspect of an embodiment of the present invention, a method for controlling traffic in a shared capacity communication system is disclosed. The method includes maintaining a throttle meter for altering a transmission state of a user among a plurality of transmission states. The throttle meter is set based on loading of the communication system.

Also, the method includes selectively transmitting content destined for the user according to a new transmission state in response to the throttle meter. Further, the method includes updating the throttle meter to reflect a current loading of the communication system.

In yet another aspect of an embodiment of the present invention, an apparatus for controlling traffic in a shared capacity communication system is disclosed. The apparatus includes means for maintaining a throttle meter for altering a transmission state of a user among a plurality of transmission states. The throttle meter is set based on loading of the communication system. The apparatus also includes means for selectively transmitting content destined for the user according to a new transmission state in response to the throttle meter, wherein the maintaining means updates the throttle meter to reflect a current loading of the communication system.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for shaping traffic of a communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to the Transmission Control Protocol/Internet Protocol (TCP/IP) suite and the global Internet, it is recognized by one of ordinary skill in the art that the present invention has applicability to other equivalent internetworking protocols and other data networks.

Figure 1:
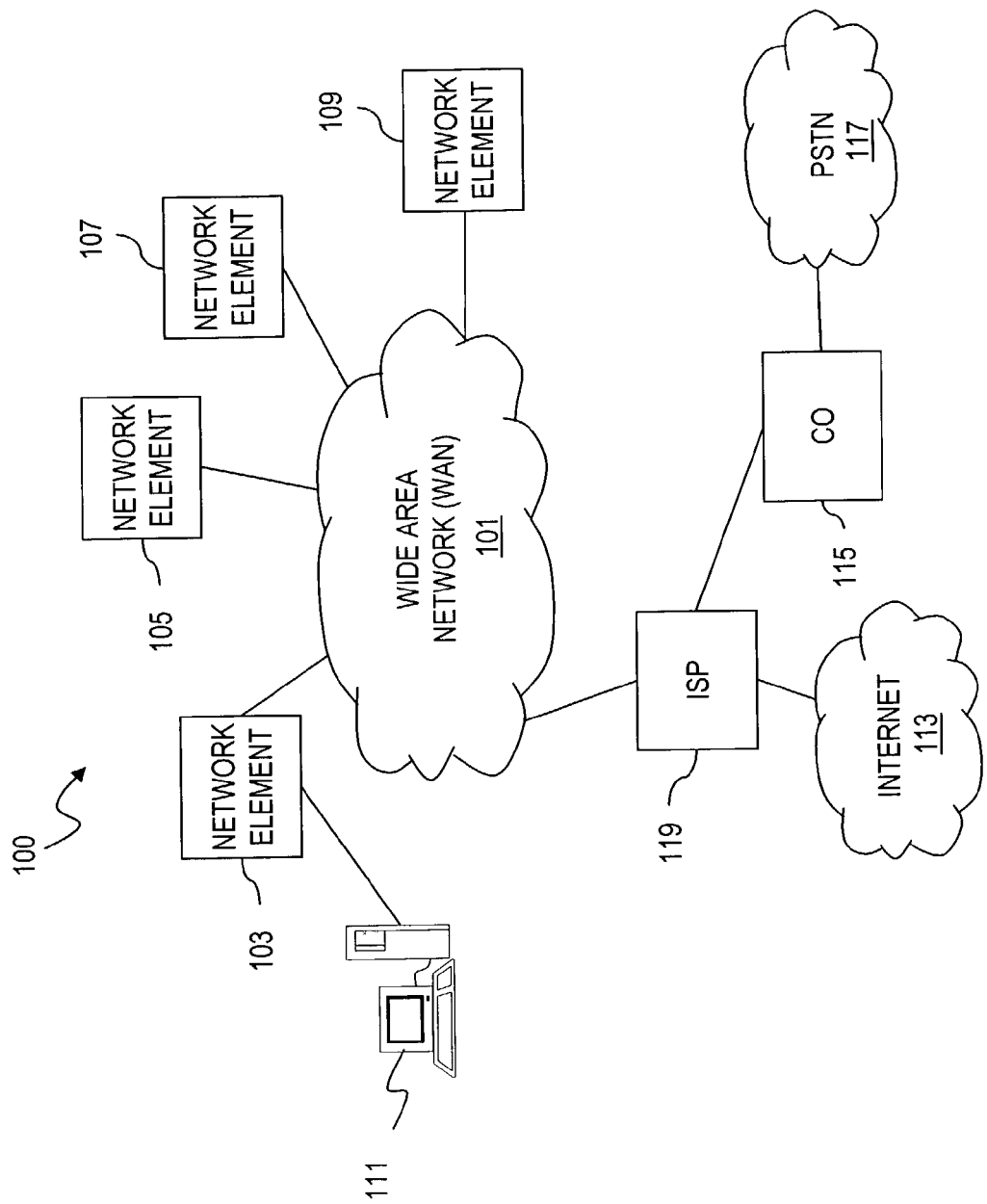
FIG. 1 is a diagram of a communication system capable of performing load sensitive throttling (LST), according to an embodiment of the present invention.

FIG. 1 is a diagram of a communication system capable of performing load sensitive throttling, according to an embodiment of the present invention. A communication system 100 includes a shared capacity network, shown in this exemplary embodiment, as a wide area network (WAN) 101, which is maintained by a service provider (e.g., carrier). The network 101 provides connectivity for a number of network elements 103, 105, 107, 109 to a public data network, such as the Internet 113. The WAN 101 serves as an infrastructure for supporting, for example, broadband services to users (e.g., host 111) connected to the network elements 103, 105, 107, 109. As will be more fully described later, the users of this shared capacity system 100 compete for resources of the WAN 101; fair access to these resources are ensured by a throttling mechanism that selectively limits the available bandwidth to various users based on load on the system 100, according to, for example, a Committed Information Rate (CIR) stemming, for example, from a Service Level Agreement (SLA).

The network elements 103, 105, 107, 109 may be any type of networking device that supports user access to the WAN 101 for receipt of the broadband services; for example, cable modems, Digital Subscriber Line (DSL) modems, Very Small Aperture Terminals (VSATs), router, bridge, or a combination thereof. In this example, a Central Office (CO) 115 relays traffic originated from the public switched telephone network (PSTN) 117 to the Internet 113 via an Internet Service Provider (ISP) 119.

Therefore, the WAN 101 may be any type of network, such as a radio communication system (e.g., satellite network, a digital cellular network, a packet radio network, a microwave network, etc.) or a terrestrial network (e.g., an Asynchronous Transfer Mode (ATM) network, frame relay network, etc.). Further, the WAN 101 may utilize any number of topologies—e.g., a fully meshed topology (i.e., connectivity).

Although the present invention has applicability to a variety of networks, including wireless and terrestrial systems, bandwidth management is of particular concern in a satellite communication system because of the engineering challenges associated with increasing system capacity. Therefore, for the purposes of explanation, the load sensitive throttling mechanism is described with respect to a satellite communication system, as shown in FIG. 2

Figure 2:
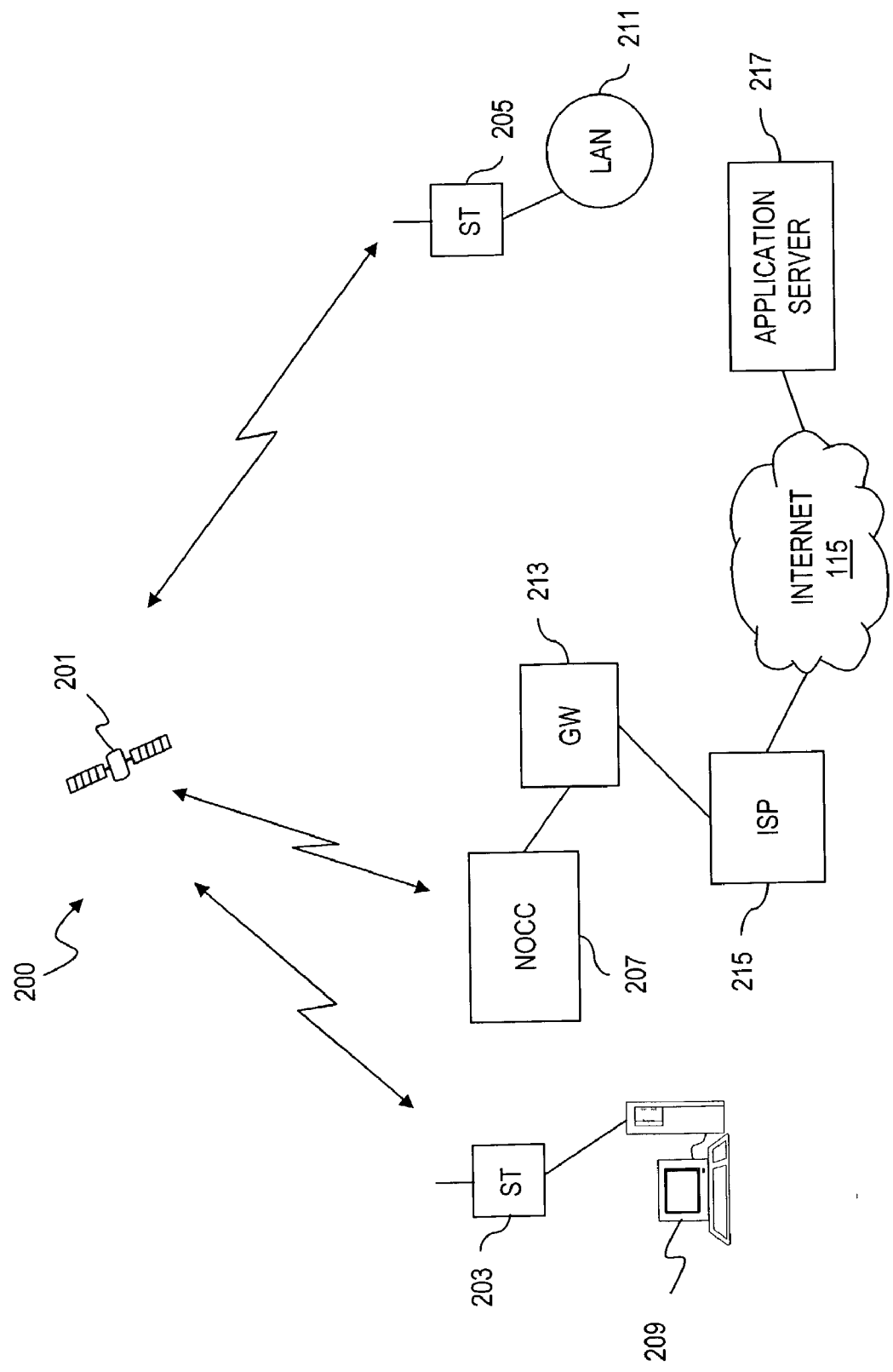
FIG. 2 is a diagram of a satellite communication system capable of ensuring fair access among users by using load sensitive throttling, in accordance with an embodiment of the present invention.

FIG. 2 is a diagram of a satellite communication system capable of ensuring fair access among users by using load sensitive throttling, in accordance with an embodiment of the present invention. The system of FIG. 2 illustrates a specific implementation of the system of FIG. 1, in which the WAN 101 is a satellite network and the network elements 103, 105, 107, 109 are in form of satellite terminals. A satellite communication system 200 utilizes a satellite 201 to transmit information to satellite terminals (STs) 203, 205, and a Network Operations Control Center (NOCC) 207. In an exemplary embodiment, the STs 203, 205 are Very Small Aperture Terminals (VSAT). The satellite 201 performs the necessary bandwidth control functions, in conjunction with the NOCC 207. In the system 200, the STs 203, 205 originate traffic from a particular coverage area and may exchange data among the other STs (not shown).

As a hub station, the NOCC 207 manages and controls communication services and operations. For example, the NOCC 207 provisions and identifies the communication channels that are to be allocated. Additionally, the NOCC 207 is responsible for controlling the bandwidth that is made available to the STs 203, 205 via a load sensitive throttling mechanism. As seen in FIG. 2, the NOCC 207 also provides interfaces, such as a gateway 213, to either private Intranets (not shown) or the public Internet 113 via an ISP 215. The NOCC 207 can support multiple receive channels (referred to as outroutes) and multiple return channels; however, the NOCC 207 can be configured to provide no return channels, depending on the application. That is, the receive support communication from the NOCC 207 to the STs 203, 205, while the return channels (if available) provide communication from the STs 203, 205 to the NOCC 207. For example, the host 209 of the ST 203 can download content from an application server 217 off the Internet 113. Depending on the content, the outroutes from the NOCC 207 to the ST 203 can be heavily utilized. Because the return channels are optional and such return channels typically do not carry heavy traffic from the STs 203, 205, the load sensitive throttling mechanism, according to an embodiment of the present invention, is described with respect to controlling the outroutes of the system 200.

Figure 3:
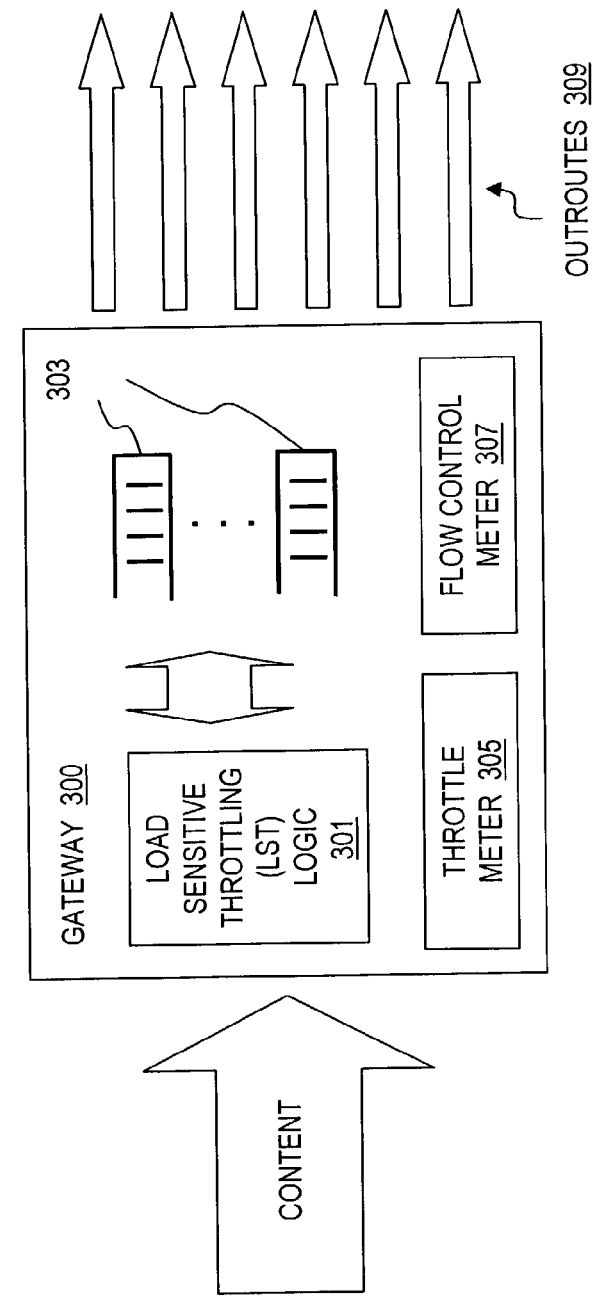
FIG. 3 is a diagram of load sensitive throttling logic deployed in a network element of the system of FIG. 1.

FIG. 3 is a diagram of load sensitive throttling logic deployed in a network element of the system of FIG. 1. The gateway 213 interfaces, for example, with the Internet 113 to retrieve content from the application server 217 for transmission across the satellite communication system 200. To manage this process, the gateway 213, according to an embodiment of the present invention, includes a load sensitive throttling (LST) logic 301 that monitors one or more buffers 303 (e.g., First In First Out (FIFO) queues) that store the content received from the application server 217. These buffers 303 are serviced, in an exemplary embodiment of the present invention, according to a leaky bucket approach; thus, these buffers 303 can be referred to as buckets. A running average or bucket size is established which is the user's maximum allowable average throughput rate. It is an average rate because the system calculates the bucket size periodically. A more detailed discussion of this leaky bucket approach is provided by commonly assigned U.S. Pat. No. 6,473,793 to Dillon et al., entitled "Method and Apparatus for Selectively Allocating and Enforcing Bandwidth Usage Requirements on Network Users," which is incorporated by reference herein in its entirety.

The gateway 213 also utilizes a flow control meter 307 to track the load on the outroutes 309. Based on the flow control meter 307, the LST logic 301 reduces the bandwidth available to the user requesting the content by limiting use (i.e., "throttling") of the outroutes by adjusting a throttle meter 305. The purpose of the throttle meter 305 is to enable the LST logic 301 to limit more and more heavily active users as the system 200 becomes heavily loaded.

The LST logic 301 maintains a running average of the flow control meter (FCMeter) and then to compute the throttle meter as a function of this running average value. The running average is updated every time the flow control meter value is incremented or decremented. The running average, Running Average Flow Control Meter (RAFC), is calculated as follows:

$$RAFC = \alpha * RAFC + (1-\alpha) * FCMeter,$$

where $\alpha$ is a configurable smoothing factor.

The LST logic 301, in an exemplary embodiment, determines a value for the Throttle Meter 305 on a periodic basis (e.g., every 60 seconds) to place the users in appropriate transmission states. This determination can be expressed in pseudo code as follows:

```
If (MinAccFCThresh)    // LST is enabled
{
    AvgFCMeter = RunningAverageFCMeter value
    If AvgFCMeter >= MinAccFCThresh
    New Throttle Meter = (Throttle Meter * (10000 +
    ThrottleMeterInc)) / 10000
    If (New Throttle Meter == Throttle Meter)
    {
        New Throttle Meter++;
    }
    Throttle Meter = MIN (New Throttle Meter, 10000)
    Else
    Throttle Meter = (Throttle Meter * (10000 –
    ThrottleMeterDec)) / 10000
}
```

The above variables are enumerated in Table 1, below.

TABLE 1

| PARAMETERS | DESCRIPTION |
| --- | --- |
| Average Flow Control Meter (AvgFC_Meter) | AvgFC_Meter represents the average value of the flow control meter. |
| Threshold Meter Setting (TMS) | TMS is the throttle meter setting that is applied to all users' "buckets" and moves users into soft, hard or discard transmission states. |
| NewThrottleMeter | NewThrottleMeter is an interim value used in the process for calculating the TMS. |
| OldThrottleMeter | OldThrottleMeter is set equal to TMS at the beginning of the process. |
| Running Average Flow Control Meter (RunningAvgFC_Meter) | RunningAvgFC_Meter is the running average of the flow control meter. |
| Flow Control Meter (FCMeter) | FCMeter is an instantaneous reading of the flow control meter. As this can vary widely, from one instant to the next, a smoothing function is applied to the FCMmeter value, and the result is the running average flow control meter. |
| Minimum Acceptable Flow Control Threshold (MinAccFC_Thresh) | MinAccFC_Thresh represents the minimum acceptable flow control threshold. Its default value is 0, which disables load sensitive throttling. When the average flow control meter falls below a certain value (e.g., 15) the throttle meter setting is decremented. MinAccFC_Thresh defines the minimum acceptable maximum speed (e.g., 240 kbps). |
| ThrottleMeterDec | ThrottleMeterDec represents the amount that the throttle meter setting is decreased when the average flow control meter is below the MinAccFCThresh value. Its default value can be 500. The throttle meter setting is multiplicatively decreased where this parameter is the amount of reduction in hundredths of a percent and ranges from 1 to 10000. With the default value, after 10 consecutive minutes of reduction the flow control meter will decrease from 10000 to 5984. |
| ThrottleMeterInc | ThrottleMeterInc represents the amount that the throttle meter setting can be increased when the flow control meter is above the MinAccFCThresh value. Its default value can be 25. The throttle meter is multiplicatively |

TABLE 1-continued

| PARAMETERS | DESCRIPTION |
| --- | --- |
| | increased where this parameter is the amount of increment in hundredths of a percent and ranges from 1 to 10000. With the default value, after 10 consecutive minutes of increase the flow meter will increase from 1000 to 1275. |
| ScaleLeakRate | ScaleLeakRate is a flag to enable/disable the scaling of the leak rate. A value of "0" disables the scaling while a value of "1" enables the scaling. |
| Flow Control Meter Smoothing Factor (FCSmoothingFactor) | FCSmoothingFactor represents the flow control meter smoothing factor ($\alpha$), and is used in the calculation of the running average of the flow control meter, or RunningAvgFC_Meter. FCSmoothingFactor is configured in tenths of a percent and may take a value between, for example, 0 and 0.950. |

Under this scenario, the host 209 and the application server 217 communicate using the Transmission Control Protocol/Internet Protocol (TCP/IP) stack. The throttling is achieved by manipulating, for example, the TCP window sizes of the host 209 and the application server 217. For example, when the host 209 makes a request to the application server 217, the request includes an advertised window size that the application server 217 should use when responding to the host 209. Because user bandwidth is proportional to window size, a decrease in window size results in a decrease in user bandwidth. Therefore, by regulating the advertised window size of each system user, each user's bandwidth can be controlled. Based on the advertised window size sent by the gateway 213, the application server 217 will adjust its send-window size, thereby increasing or decreasing its transmission data rate. Manipulation of these TCP windows are also described in the incorporated Dillon et al. U.S. Pat. No. 6,473,793.

Although shown separate from the NOCC 207, the gateway 213 can be implemented as a component of the NOCC 207. The NOCC 207 broadcasts over the outroutes 309 the packets received from the gateway 213.

Data transmitted through the communication system 200 generally is transmitted as quickly as possible to satisfy a user's data requirements. However, it is possible that a few users will attempt to acquire such a great amount of data that their data acquisition uses more and more of the systems resources, effectively slowing down other user's data acquisition. All data is transmitted at a constant rate in one or more channels. The duration and number of channels that is allocated to the user determine how much data can be transmitted in a given amount of time. Accordingly, the LST logic 301 employs a leaky bucket approach to bandwidth management by imposing transmission states to users. These transmission states, which are more fully described below in FIG. 4, are categorized based on transmission behavior of the users and the load of the system 200.

Figure 4:
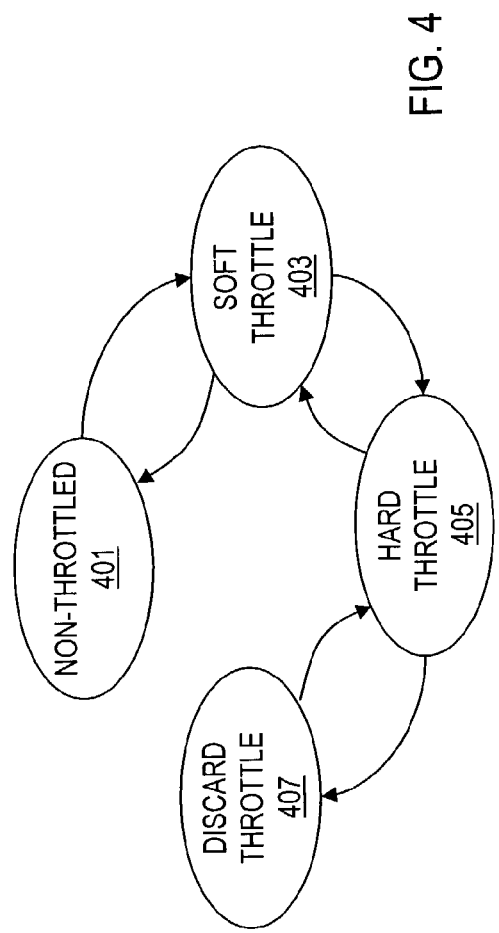
FIG. 4 is a diagram of exemplary transmission (or throttle) states associated with users, according to an embodiment of the present invention.

FIG. 4 is a diagram of exemplary transmission states associated with users, according to an embodiment of the present invention. The LST logic 301 imposes the following transmission states (or throttle states) on the users of the system 200, in order of severity of bandwidth limitation: an Non-throttled state 401, a Soft Throttle state 403, a Hard Throttle state 405, and a Discard Throttle state 407. In the Non-throttled state 401, there are no limitations, per se, on the user. The first level of restriction, is the Soft Throttle state 403. In the Hard Throttle state 405, the bandwidth that is made available to the user is even more restricted. Lastly, in the Discard Throttle state 407, the LST logic 301 would require dropping (i.e., discarding) of packets.

As mentioned above, the LST mechanism is effected by manipulating the TCP window sizes. TCP receive window for each TCP connection can be calculated from the user window. If Load Sensitive Throttling mechanism is enabled for the gateway 300, the user window size for a throttled or non-throttled user is calculated by taking into account the configured throughput, user's transmission state, and the value of the Flow Control Meter 307. For example, assuming the window sizes of a user are as follows: W, Ws and Wh for Non-Throttle, Soft Throttle and, Hard Throttle states, respectively. These windows are calculated using the configured throughputs and a Round-Trip Time (RTT) value. If the user is in the Hard Throttle state 405, then the window size is the minimum of the hard-throttled window and the flow controlled non-throttled window for the user.

User Window=MIN($Wh$, (FCMeter*$W$)/100).

If the user is in the Soft Throttle state 403, then the window is as follows:

User Window=(FCMeter*$Ws$)/100

If the user is in the Non-Throttled state 401, then the window is as follows:

User Window=(FCMeter*$W$)/100

The TCP connection window is the receive buffer size allocated for each TCP connection. TCP connection window is calculated from the user window based on the user's transmission state and total number of connections. If the user is in either the Hard Throttle state 405 or the Soft Throttle state 403, the TCP connection window can be computed as follows:

If (Total number of connections > 2)
    TCP Connection Window = User Window / Total number of connections
    Else
        TCP Connection Window = User Window The number of connections, in an exemplary embodiment, should be greater than two for division. As any FTP (File Transfer Protocol) session has 2 TCP connections, this allows FTP to operate at full speed.

If the user is in the Non-Throttled state 401, then the TCP window equals the User Window:

TCP Connection Window=User Window.

The TCP connection window, as calculated above for throttled or non-throttled users, is then compared with memory controlled per connection window. Memory controlled per connection window is a global gateway-wide window calculated as follows.

Memory controlled per connection window=MIN (Configured Maximum Window, Configured Total Memory/Number of maximum connections allowed)

Then,

TCP Connection Window=MIN (Memory controlled per connection window, TCP Connection Window)

Checks are performed to determine whether the TCP connection window is less than a Maximum Segment Size (MSS). If the TCP connection window is less than MSS, then some connections are given MSS window size, and some connections are given zero window size depending on how many bytes there are in the transmit queues of all the TCP connections for that particular user. The value of MSS is a default compile time value equal to, for example, 1436.

```
If (TCP Connection Window < MSS)
{
    If (Total Bytes in Queue for the User < User Window)
        TCP Connection Window = MSS
    Else
        TCP Connection Window = 0
}
```

As mentioned above, the LST logic 301 employs a leaky bucket approach to resource management, whereby a bucket is maintained for each user that keeps track of the number of bytes sent to the user over the satellite link. The bucket of a user helps determine the transmission state of the particular user. As the system dedicates one or more outroutes (i.e., bandwidth) to a user's request, the user's throughput rate increases. The bucket begins to fill at whatever rate the system allows it to, based on outroute availability and file size. The user's bucket may then fill at a rate much faster than which it can be emptied (the leak rate). As the throughput rate increases, the transmission state changes, as shown in FIG. 4. Corresponding to these states of Non-throttled state 401, Soft Throttle state 403, Hard Throttle state 405, and Discard Throttle state 407 are the respective leaky bucket threshold rates: Soft Throttle Rate (STHR), Hard Throttle Rate (HTHR), and Discard Throttle Rate (DTHR). The soft and hard throttle states restrict the user from requesting additional data. The system 200 reallocates the outroutes, effectively limiting how much data can be transmitted to user. It is possible, though, for the user to persist in requesting even more data. If this occurs and DTHR 1310 is reached, the system will discard user's data until the user's throughput rate reaches the HTHR.

Figure 5:
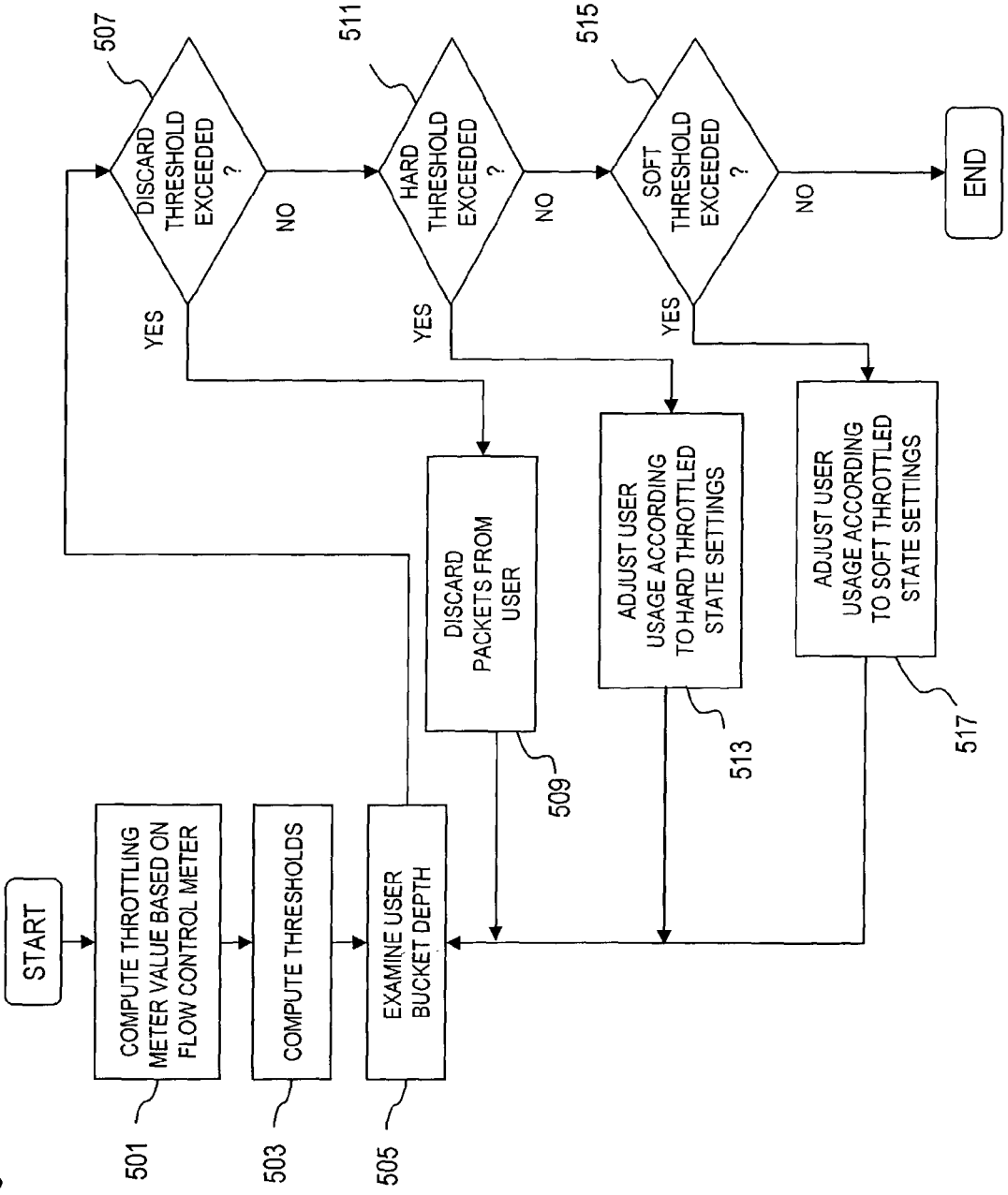
FIG. 5 is a flowchart showing the operation of the load sensitive throttling logic of FIG. 3.

The LST logic 301 periodically compares the user current bucket size with threshold values corresponding to the transmission states (i.e., Non-throttled state 401, Soft Throttle state 403, Hard Throttle state 405, and Discard Throttle state 407); the user enters the appropriate state based on this comparison, as detailed with respect to FIG. 5.

FIG. 5 is a flowchart showing the operation of the load sensitive throttling logic of FIG. 3. The LST logic 301 monitors data throughput from the users via the Flow control meter 307, and periodically calculates a new TMS value for the Throttle Meter 305, which measures a user's data throughput. Thus, the new TMS value is calculated based on the value of the Flow control meter 307, as in step 501. The Throttle Meter 305 is used to determine, per step 503, the threshold values for the transmission states 401, 403, 405, 407.

When the LST logic 301 is activated, the threshold values are calculated and scaled using the current value of the Throttle Meter 305. The LST logic 301, in an exemplary embodiment, utilizes values between 0 and 10,000 for the Throttle Meter 305, which initially is set to 10,000. The Throttle Meter 305 effectively scales the user's bucket depth as necessary to move a user into a Hard Throttle state 405. This bucket depth necessary to move a user into hard throttling is referred to as the Hard Throttle Rate (HTHR). The HTHR can range from 0 (all users are in the Hard Throttle state as soon as data throughput occurs) to 10,000 (all users may eventually reach the Hard Throttle state). Similarly, the Soft Throttle Rate (STHR) is the rate at which a user is moved from a Non-throttled state 401 to a Soft Throttle state 403; and the Discard Throttle Rate (DTHR) is the rate at which the user moves from the Hard Throttle state 405 to the Discard Throttle state 407.

To control the HTHR, the gateway 300 is configured with a minimum acceptable flow control meter threshold (MinAccFC_Thresh). The value MinAccFC_Thresh is set to roughly correspond to the minimum acceptable quality of service. The Flow Control Meter 307 measures the throughput rate for the entire gateway 300. When the Flow Control Meter 307 rises above a predetermined threshold, the LST logic 301 reduces all users' HTHR. If every user's HTHR decreases, a greater percentage of users bucket depth would exceed HTHR, and the number of hard throttled users will increase. As the value of the Flow Control Meter 307 decreases, the load to be carried also decreases. The result is that when heavily loaded, MinAccFC_Thresh remains near the minimum acceptable quality of service level while HTHR varies to equalize the load carried by the system.

According to one embodiment of the present invention, the soft and hard throttle thresholds are scaled by the Throttle Meter, while the discard threshold is not scaled. The new threshold values are determined as follows:

New Threshold=(Throttle Meter*Threshold)/10000

Thus, if the throttle meter value is less than 10000, the soft throttle and hard throttle thresholds would be less than the configured threshold. The user bucket size would be compared with the new thresholds and user would be put in appropriate throttle state.

Optionally, the LST logic 301 can calculate a new leak rate, which, as has been described, is the rate at which data "leaks" from a user's bucket as it is filled. In addition to the thresholds, Bucket Leak rate would also be scaled:

NewLeakRatePerMinute=(Throttle Meter*LeakRatePerMinute)/10000.

Following the determination of the new threshold values for the throttle states, the LST logic 301 then monitors the user's bucket depth, as in step 505, for all the users. Next, the LST logic 301 compares the users' bucket depths to the new threshold throttling values, placing such users into the suitable throttle states as appropriate, per steps 507-517. Specifically, the LST logic 301 determines, as in step 507, whether the DTHR threshold has been exceeded; if so, the user is placed in the Discard Throttle state 407, whereby packets are dropped (step 509). If the DTHR threshold has not been exceeded, the LST logic 301 checks, as in step 511, whether the HTHR threshold has been crossed, in which case the user is placed into the Hard Throttle state 405. In this state 405, the user's available bandwidth is limited accordingly, per step 513. If the bucket depth of the user is below the HTHR threshold, the LST logic 301 determines whether the STHR threshold is exceeded (step 515), thereby placing the user into the Soft Throttle state 403, such that the user's bandwidth usage is adjusted accordingly, per step 517.

According to one embodiment of the present invention, different classes of users may have different throttle meter settings. For example, a business-class user might pay a premium to enjoy a different HTHR that provides greater bandwidth allocation (data throughput) than a consumer-class user. Further classifications may be implemented, for researchers, government/military or marketing-related entities (e.g., special introductory offers, etc.). The following parameter settings are used to offer business-class users their preferred quality of service: MaxRcvWinSize (Maximum Receive Window Size)—set to allow, with the expected round-trip time, operation at the maximum achievable throughput. This setting prevents the Business-Class service from offering higher throughput than the consumer service when the system is lightly loaded. This MaxRcvWinSize value can be is set on a per-gateway basis.

The above process of load sensitive throttling can effectively implement a fair access policy such that all users of the system 200 can utilize system resources according to, for example, their CIR. The advantages of this mechanism are made apparent in FIGS. 7A-7C. First, a baseline is established by examining a scenario in which the load sensitive throttling mechanism is not present, as shown in FIG. 6.

Figure 6:
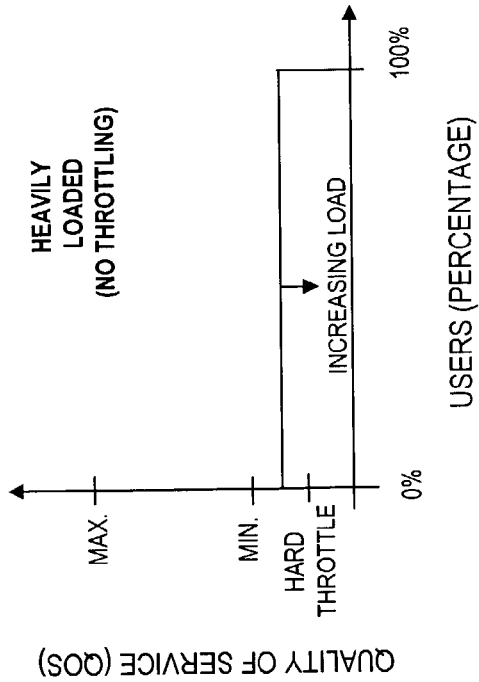
FIG. 6 is graph showing the relationship between Quality of Service (QoS) levels versus the population of users in a heavily loaded system without load sensitive throttling.

FIG. 6 is graph showing the relationship between Quality of Service (QoS) levels versus the population of users in a heavily loaded system without load sensitive throttling. Under this scenario, no LST mechanism is deployed, wherein the system 200 experiences heavy loading (e.g., outroute load increases). "Loading" refers to how much data throughput is being used, or how much bandwidth is being consumed by users accessing the gateway 300. The graph shows the relationship between the Quality of Service (QoS) and the amount of users attaining the QoS, as measured in terms of a user's maximum achievable download speed and, to a lesser extent, a user's response time for content retrieval (e.g., graphics intensive web pages). The graph reveals that all users are affected equally, such that the QoS falls below the minimum acceptable quality. In other words, the system 200 provides lower and lower quality of service to all users as the load increases and, when heavily loaded, none of the users obtain the minimum acceptable quality.

By contrast, when the LST mechanism is invoked, those users who are utilizing large amounts of system resources are affect first, such that a significant number of users still maintain acceptable QoS levels.

Figure 7A:
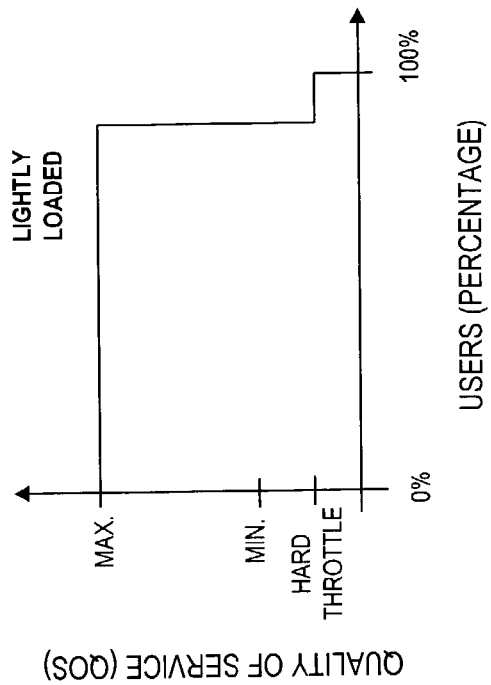
FIGS. 7A-7C are graphs showing the relationship between Quality of Service (QoS) levels versus the population of users, respectively, under a lightly loaded condition, moderately loaded condition, and heavily loaded condition, with load sensitive throttling in effect.
Figure 7C:
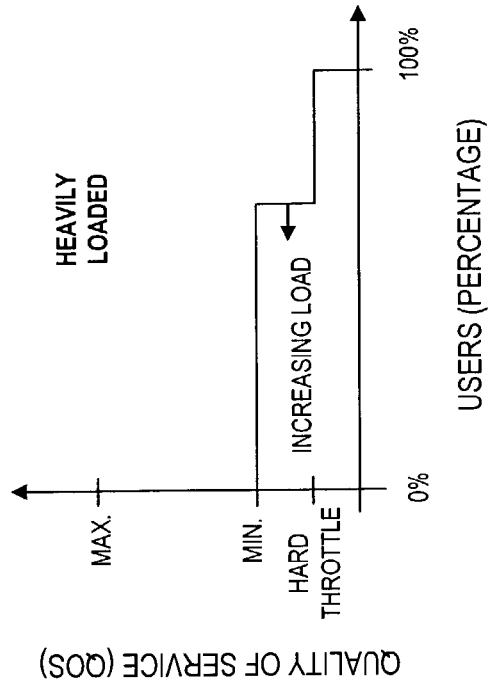
Figure 7B:
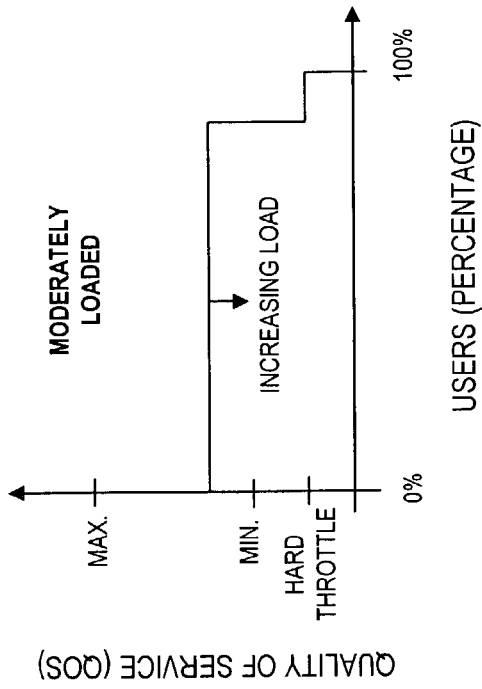

FIGS. 7A-7C are graphs showing the relationship between Quality of Service (QoS) levels versus the population of users under a lightly loaded condition, moderately loaded condition, and heavily loaded condition, with load sensitive throttling in effect. FIG. 7A shows that, when the LST logic 301 is enabled, under a light load, the system 200 can support the highest level of QoS for the majority of the users. A few of the heavy use users enter the Hard Throttle state 405.

Under a moderately loaded scenario, the most users' QoS levels degrade equally as the load increases down towards a configurable minimum acceptable quality. The level of QoS received by users in the Hard Throttle state 405 remains unchanged from the lightly loaded situation, as seen in FIG. 7B.

Under a heavy load, the minimum acceptable quality of service can, as load increases, only be maintained for most users by increasing the population of hard throttled users (FIG. 7C). If the load increases, eventually all of the users will receive the hard throttle quality of service. In an exemplary embodiment, the system 200 is managed so that this should not occur. It is recognized that under even greater load, the Discard Throttle state 407 can be imposed on some or all of the users.

As evident from the graphs of FIGS. 7A-7C, the LST logic 301 provides a number of advantages. The LST mechanism supports more efficient utilization of a scarce resource, namely, bandwidth, by encouraging heavy users to make use of bandwidth during lightly loaded periods. As a result, capacity of the channel, when averaged over a long period of time is higher, thereby allowing the system to carry more data. Also, the light users enjoy a high Quality Of Service level, as compared to the baseline of FIG. 6 in which all users suffered significant degradation of throughput and quality of service when the channel became heavily loaded. With the LST mechanism, the most economically advantageous users (i.e., light users) are given very good performance, even when the system is heavily loaded. In addition, heavy users are permitted to enjoy more total consumption that than the baseline scenario, in that they are granted much higher access to bandwidth during lightly loaded periods of time. Another advantage achieved through the LST mechanism is that heavy users learn to adjust their behavior to match what the system 200 gives them. With LST, these heavy users learn to move their consumption to lightly loaded periods as they are first throttled during busy periods, thereby leaving more bandwidth available for lightly loaded users during this busy period.

It is recognized that the LST logic 301 can be implemented in hardware, software, firmware, or any combinations thereof, and utilized in enhancing performance of numerous types of networks (e.g., wireless and terrestrial systems). In particular, the LST logic 301 can be implemented in a general purpose computer, as described below.

Figure 8:
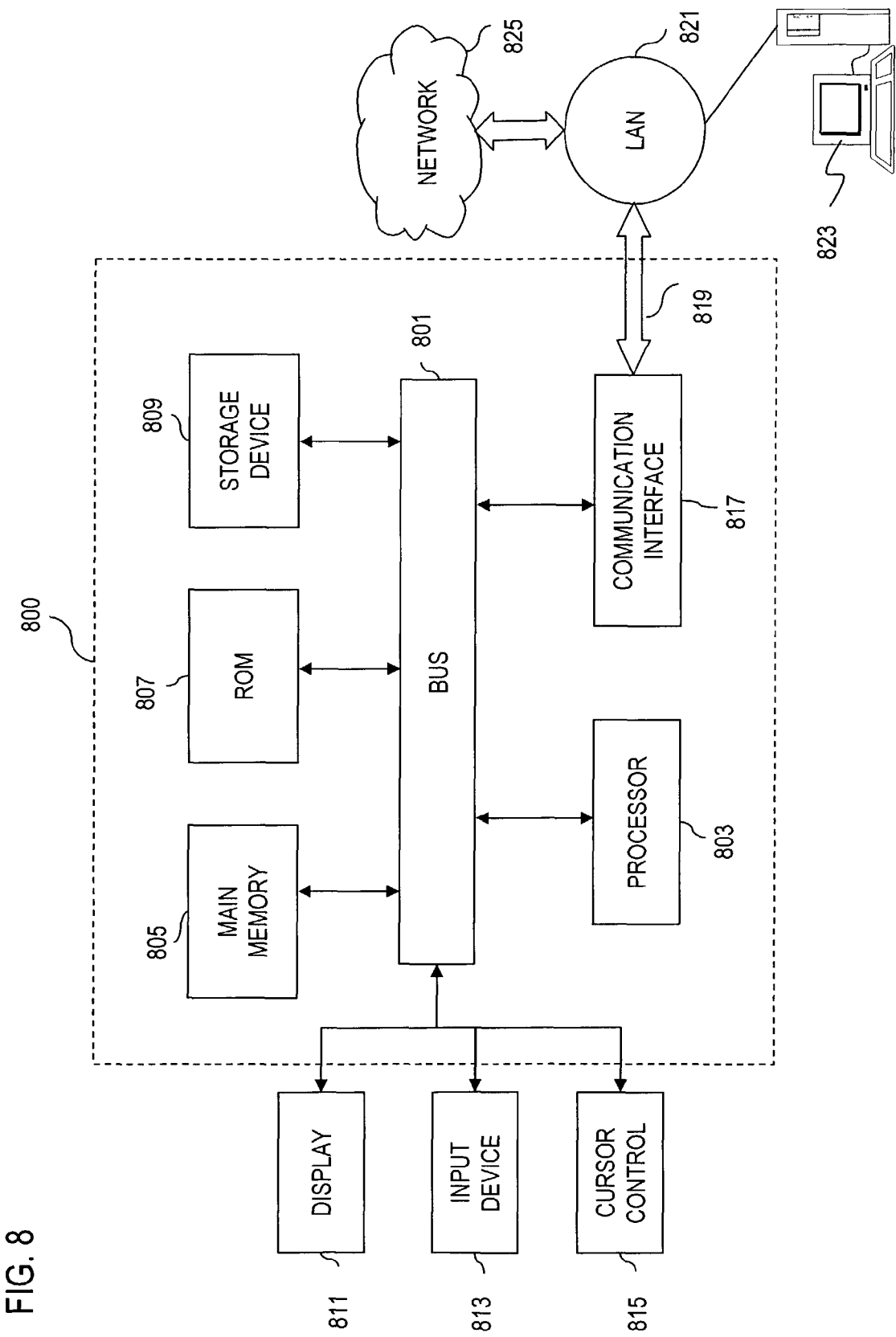
FIG. 8 is a diagram of a computer system that is capable of implementing the load sensitive throttling logic of FIG. 3, according to an embodiment of the present invention.

FIG. 8 is a diagram of a computer system that implements the load sensitive throttling logic of FIG. 3, according to an embodiment of the present invention. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, the cache list generator 601 is implemented by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the present invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach is provided for performing traffic shaping of a shared capacity communication system (e.g., wireless, terrestrial, or satellite systems) using a load sensitive throttling (LST) mechanism. The LST mechanism utilizes a flow control meter to track the load (e.g., outroutes) and a throttle meter to regulate bandwidth that is made available to the users. By establishing thresholds corresponding to various transmission states, the LST mechanism can control traffic behavior of users, thereby promoting fair access and more effectively guarantee Quality of Service (QoS) levels.

While the present invention has been described in connection with a number of embodiments and implementations, the present invention is not so limited but covers various obvious modifications and equivalent arrangements, which fall within the purview of the appended claims.

What is claimed is:

1. A method for shaping traffic of a communication system, the method comprising:
   determining resource usage of a plurality of network elements in the communication system;
   comparing the usage with a plurality of thresholds, the thresholds being determined according to loading of the communication system;
   causing a computer to adjust, based on the comparison, the resource usage of the network elements, in order to balance system resources, according to one of a plurality of transmission states corresponding to the plurality of thresholds; and
   causing the computer to selectively determine the transmission state of stored content for the plurality of network elements,
   wherein the resource usage of at least one network element is adjusted to be different from the resource usage for another network element based at least in part on the resource usage of the network elements over time.

2. A method according to claim 1, further comprising:
   maintaining a flow control meter to track the loading of the communication system;
   setting a throttle meter based on the value of the flow control meter to control the resource usage; and
   computing the plurality of thresholds according to the throttle meter.

3. A method according to claim 1, further comprising:
selectively buffering content that is to be transmitted to the network elements according to a leaky bucket scheme, wherein bucket depth associated with the leaky bucket scheme is set according to the one transmission state.

4. A method according to claim 1, wherein the communication system utilizes a flow control window to transmit content to the network elements, the method further comprising:
setting size of the flow control window according to the one transmission state.

5. A method according to claim 1, wherein the communication system includes a satellite communication system, and at least one network element is a Very Small Aperture Terminal (VSAT), the method further comprising:
limiting use of outroutes of the satellite network according to the one transmission state.

6. A method according to claim 1, wherein the transmission states in the comparing step include an unthrottled state, a soft throttle state, a hard throttle state, and a discard throttle state.

7. A method according to claim 1, further comprising:
correlating the transmission states to a plurality of quality of service (QoS) levels.

8. A non-transitory hardware computer-readable storage medium encoded with executable instructions and executable by a computer for shaping traffic of a communication system, the instructions being arranged, upon execution, to cause one or more processors to perform: determining resource usage of a plurality of network elements in the communication system;
comparing the usage with a plurality of thresholds, the thresholds being determined according to loading of the communication system;
adjusting, based on the comparison, the resource usage of the network elements, in order to balance system resources, according to one of a plurality of transmission states corresponding to the plurality of thresholds; and
selectively determining the transmission state of stored content for the plurality of network elements,
wherein the resource usage of at least one network element is adjusted to be different from the resource usage for another network element based at least in part on the resource usage of the network elements over time.

9. A network apparatus for shaping traffic of a communication system, the apparatus comprising:
a plurality of buffers configured to selectively store corresponding content destined to respective plurality of hosts; and
logic configured to determine throughput associated with each of the buffers, and to specify one of a plurality of transmission states based upon a comparison of the throughput with a plurality of thresholds corresponding to the transmission states in order to balance the system resources, the thresholds being established based upon loading of the communication system, wherein the logic permits selective transmission of the stored content according to the one transmission state, wherein the transmission state for one host is selected to be different from the transmission state for another host based at least in part on the throughput used by the hosts over time.

10. An apparatus according to claim 9, further comprising:
a flow control meter configured to track the loading of the communication system; and
a throttle meter based on the value of the flow control meter to control the selective transmission, wherein the plurality of thresholds are set according to the throttle meter.

11. An apparatus according to claim 9, wherein the buffers are serviced according to a leaky bucket scheme, wherein bucket depths associated with the leaky bucket scheme is set according to the one transmission state.

12. An apparatus according to claim 9, wherein the content is transmitted to an associated host according to a flow control window, the size of the flow control is set according to the one transmission state.

13. An apparatus according to claim 9, wherein the communication system is a satellite network including a network element that is a Very Small Aperture Terminal (VSAT), and the logic being further configured to control use of outroutes of the satellite network according to the one transmission state.

14. An apparatus according to claim 9, wherein the transmission states include an unthrottled state, a soft throttle state, a hard throttle state, and a discard throttle state.

15. An apparatus according to claim 9, wherein the transmission states are correlated with a plurality of quality of service (QoS) levels.

16. A hub station system for shaping traffic of a communication system, the system comprising:
a transmission system for communicating over a satellite to a plurality of terminals each interfacing with a host; and
a gateway coupled to the transmission system and configured to communicate with a data network coupled to a content server, the gateway including,
memory configured to selectively store content destined to the hosts from the content server, and
logic configured to determine throughput associated with the hosts, and to specify one of a plurality of transmission states based upon a comparison of the throughput with a plurality of thresholds corresponding to the transmission states in order to balance system resources, the thresholds being established based upon loading of the transmission system, wherein the logic permits selective transmission of the stored content according to the one transmission state, wherein the transmission state for one host is selected to be different from the transmission state of another host based at least in part on the throughput used by the hosts over time.

17. A system according to claim 16, wherein the gateway further includes:
a flow control meter configured to track the loading; and
a throttle meter based on the value of the flow control meter to control the selective transmission, wherein the plurality of thresholds are set according to the throttle meter.

18. A system according to claim 16, wherein the content within the memory is processed according to a leaky bucket scheme, wherein bucket depths are set according to the one transmission state.

19. A system according to claim 16, wherein the content is transmitted to the host according to a flow control window, the size of the flow control is set according to the one transmission state.

20. A system according to claim 19, wherein the flow control window is managed according to a Transmission Control Protocol (TCP).

21. A system according to claim 16, wherein the transmission states include an unthrottled state, a soft throttle state, a hard throttle state, and a discard throttle state.

22. A system according to claim 16, wherein the transmission states are correlated with a plurality of quality of service (QoS) levels.

23. A method for controlling traffic in a shared capacity communication system, the method comprising:
maintaining a throttle meter on a computer for altering a transmission state of a plurality of users among a plurality of transmission states, the throttle meter being set based on loading of the communication system;

updating the throttle meter to reflect the resource usage of at least one of the plurality of users;

causing the computer to selectively transmit content destined for the users according to a new transmission state in response to the throttle meter in order to balance system resources, wherein the transmission state for one user is selected to be different from the transmission state of another user based at least in part on the resource usage of the users over time; and updating the throttle meter to reflect a current loading of the communication system.

24. A method according to claim 23, further comprising:

establishing a plurality of thresholds corresponding to the transmission states according to the throttle meter;

comparing throughput associated with the user with the thresholds; and classifying the user into the new transmission state based on the comparison.

25. A method according to claim 23, further comprising:

maintaining a flow control meter to track the loading of the communication system; and setting the throttle meter based on the value of the flow control meter.

26. A method according to claim 23, further comprising:

selectively buffering the content according to a leaky bucket scheme, wherein bucket depth associated with the leaky bucket scheme is set according to the new transmission state.

27. A method according to claim 23, further comprising:

setting size of a flow control window associated with transmission of the content from a content server according to the new transmission state.

28. A method according to claim 23, wherein the transmission states in the maintaining step include an unthrottled state, a soft throttle state, a hard throttle state, and a discard throttle state.

29. A method according to claim 23, further comprising:

correlating the transmission states to a plurality of quality of service (QoS) levels.

30. A method according to claim 23, wherein a measurement of resource usage is based on a level of a leaky bucket that tracks bytes of data sent to a user.

31. A non-transitory hardware computer-readable storage medium encoded with executable instructions and executable by a computer for controlling traffic in a shared capacity communication system, the instructions being arranged, upon execution, to cause one or more processors to perform:

maintaining a throttle meter for altering a transmission state of a plurality of users among a plurality of transmission states, the throttle meter being set based on loading of the communication system;

updating the throttle meter to reflect the resource usage of at least one of the plurality of users;

selectively transmitting content destined for the users according to a new transmission state in response to the throttle meter in order to balance system resources, wherein the transmission state for one user is selected to be different from the transmission state of another user based at least in part on the resource usage of the users over time; and updating the throttle meter to reflect a current loading of the communication system.

32. An apparatus for controlling traffic in a shared capacity communication system, the apparatus comprising:

means for maintaining a throttle meter for altering a transmission state of a plurality of users among a plurality of transmission states, the throttle meter being set based on loading of the communication system;

means for updating the throttle meter to reflect the resource usage of at least one of the plurality of users; and means for selectively transmitting content destined for the users according to a new transmission state in response to the throttle meter in order to balance system resources, wherein the transmission state for one user is selected to be different from another user based at least in part on the resource usage of the users over time, and the maintaining means updates the throttle meter to reflect a current loading of the communication system.

33. An apparatus according to claim 32, further comprising:

means for establishing a plurality of thresholds corresponding to the transmission states according to the throttle meter;

means for comparing throughput associated with the user with the thresholds; and means for classifying the user into the new transmission state based on the comparison.

34. An apparatus according to claim 32, further comprising:

means for maintaining a flow control meter to track the loading of the communication system, wherein the means for maintaining the throttle meter sets setting the throttle meter based on the value of the flow control meter.

35. An apparatus according to claim 32, further comprising:

means for selectively buffering the content according to a leaky bucket scheme, wherein bucket depth associated with the leaky bucket scheme is set according to the new transmission state.

36. An apparatus according to claim 32, further comprising:

means for setting size of a flow control window associated with transmission of the content from a content server according to the new transmission state.

37. An apparatus according to claim 32, wherein the transmission states include an unthrottled state, a soft throttle state, a hard throttle state, and a discard throttle state.

38. An apparatus according to claim 32, wherein the transmission states are correlated with a plurality of quality of service (QoS) levels.

* * * * *